United States Patent
Shilo (10) Patent No.: US 11,210,962 B2
(45) Date of Patent: Dec. 28, 2021

(54) ELECTRONIC DISPLAY AND METHOD FOR MEMORIZING THEMES

(71) Applicant: A.R. Head Ventures LTD., Gedera (IL)

(72) Inventor: Ronen Shilo, Gedera (IL)

(73) Assignee: A.R. HEAD VENTURES LTD, Magshimim (IL)

(*) Notice: Subject to any disclaimer, the term of this patent is extended or adjusted under 35 U.S.C. 154(b) by 149 days.

(21) Appl. No.: 16/848,607

(22) Filed: Apr. 14, 2020

(65) Prior Publication Data
US 2021/0319711 A1  Oct. 14, 2021

(51) Int. Cl.
*G09B 5/02* (2006.01)
*G06T 11/00* (2006.01)

(52) U.S. Cl.
CPC .............. *G09B 5/02* (2013.01); *G06T 11/001* (2013.01)

(58) Field of Classification Search
None
See application file for complete search history.

(56) References Cited

U.S. PATENT DOCUMENTS

| | | |
|---|---|---|
| 4,944,519 A | 7/1990 | Canela |
| 5,161,978 A | 11/1992 | Kahn |
| 5,772,441 A | 6/1998 | Wilson |
| 6,186,795 B1 | 2/2001 | Wilson |
| 6,585,520 B1 | 7/2003 | Berman |
| 7,074,128 B2 | 7/2006 | Berman |
| 7,292,984 B2 | 11/2007 | Kikuchi |
| 7,657,421 B2 | 2/2010 | Barnes et al. |
| 8,727,788 B2 | 5/2014 | Kelly et al. |
| 9,041,632 B2 | 5/2015 | Funk et al. |
| 9,972,059 B2 | 5/2018 | Acar |
| 10,046,242 B1 | 8/2018 | Abbas |
| 10,127,825 B1 | 11/2018 | Nguyen |
| 2003/0194686 A1 | 10/2003 | Berman |
| 2014/0017652 A1 | 1/2014 | Perdreau |
| 2016/0019885 A1* | 1/2016 | Romano ............... G06F 40/109 704/9 |

OTHER PUBLICATIONS

Eduonix, "Clustering Similar Sentences Together Using Machine Learning", Aug. 23, 2019, URL: https://blog.eduonix.com/artificial-intelligence/clustering-similar-sentences-together-using-machine-learning/ (Year: 2019).*
Jeff Clark, "Word Cluster Diagram", Apr. 18, 2011, URL: https://neoformix.com/2011/WordClusterDiagram.html (Year: 2011).*

* cited by examiner

*Primary Examiner* — David H Chu (57) ABSTRACT

An electronic display and method for memorizing a theme are disclosed. A theme is exhibited via a picture and a plurality of phrases associated with the theme. The phrases are intermittently highlighted individually over the picture. Each word of each phrase is designated a fixed location relative to the picture, each phrase being scattered over the picture and a phrase is interspersed among other phrases.

21 Claims, 5 Drawing Sheets

ELECTRONIC DISPLAY AND METHOD FOR MEMORIZING THEMES

BACKGROUND OF THE INVENTION

Field of the Invention

The present invention relates to memorization aids, and in particular to electronic displays used as memorization aids.

Description of Related Art

Many are interested in themes, such as famous people, exotic places or rare animals, and wish to memorize such themes.

Visual memorization works for many, who remember themes by their visual content such as pictures and text, and further by shape, position, color and other unique visual aspects of the ways such themes are presented.

BRIEF SUMMARY OF THE INVENTION

The present invention seeks to provide systems and functionalities for memorizing a theme via a picture and a plurality of phrases associated with the theme, as well as by presenting different phrases differently from each other.

According to some embodiments of the present invention, there is provided an electronic display for exhibiting a theme via a picture and a plurality of phrases, the picture and phrases associated with the theme. The display comprises a transparent or translucent substrate; a picture layer of dyes disposed on the substrate and showing the picture; words of the plurality of phrases embedded as voids or transparent letters or translucent letters within the picture layer, wherein: (i) the words of each phrase are scattered across the picture, and (ii) words of a phrase of the plurality of phrases are interspersed among words of other phrases of the plurality of phrases. A set of light sources is disposed behind the substrate for controllably illuminating letters or words embedded within the picture layer so that illuminated letters or words are highlighted over the picture. A control circuit is provided for selectively actuating light sources of the set of light sources to intermittently highlight each phrase of the plurality of phrases for being individually highlighted over the picture. By individually highlighting a phrase is meant that the phrase is highlighted while the other phrases of the plurality of phrases are not highlighted, possibly except for an optional fade-in/fade-out period between highlighting phrases. By a word embedded as voids within the picture layer is meant that the letters of the word are presented by unprinted areas over the substrate, while a word embedded as transparent or translucent letters is meant that the letters are printed over the substrate using transparent or translucent dye.

Words of the plurality of phrases, while not highlighted, may appear in dim type over the picture. To ease memorization, the plurality of phrases may be limited to no more than ten phrases. For better memorization and richer information, each phrase of the plurality of phrases may include at least eight words. The duration of highlighting a phrase may be different for different phrases. For example, the duration of highlighting a phrase may be proportionate to the phrase's word count, for easier reading and better digestion of the phrase's content. In some cases, the highlighting duration may be different for different highlighting occurrences of the same phrase, so that the same phrase may be highlighted for a first duration in a first highlighting occurrence and the same phrase may be highlighted again but for a second duration in a second highlighting occurrence. Further, for better memorization and higher interest, phrases may be highlighted in random order, and/or different phrases may appear in different fonts and/or different colors.

Also provided is a method for exhibiting a theme via presenting a picture and a plurality of phrases, the picture and phrases associated with the theme. The method comprises visually exhibiting the picture, and designating for each word of the plurality of phrases a fixed location relative to the picture, so that: (i) the words of each phrase are scattered across the picture, and (ii) words of a phrase of the plurality of phrases are interspersed among words of other phrases of the plurality of phrases. The method further comprises intermittently highlighting each phrase of the plurality of phrases individually over the picture, each word located according to the respective designated fixed location of the word.

The method may further include that words of the plurality of phrases, while not highlighted, may appear in dim type over the picture. To ease memorization, the plurality of phrases may be limited to no more than ten phrases. For better memorization and richer information, each phrase of the plurality of phrases may include at least eight words. Also, the duration of highlighting a phrase may be different for different phrases, such as be proportionate to the phrase's word count, for easier reading and better digestion of the phrase's content. In some cases, the highlighting duration may be different for different highlighting occurrences of the same phrase, so that the same phrase may be highlighted for a first duration in a first highlighting occurrence and the same phrase may be highlighted again but for a second duration in a second highlighting occurrence. Further, for better memorization and higher interest, phrases may be highlighted in random order, and/or different phrases may appear in different fonts and/or different colors.

BRIEF DESCRIPTION OF THE DRAWINGS

The present invention will be understood and appreciated more fully from the following detailed description, taken in conjunction with the drawings in which.

DETAILED DESCRIPTION

Memorization Techniques and Aids

Figure 1:
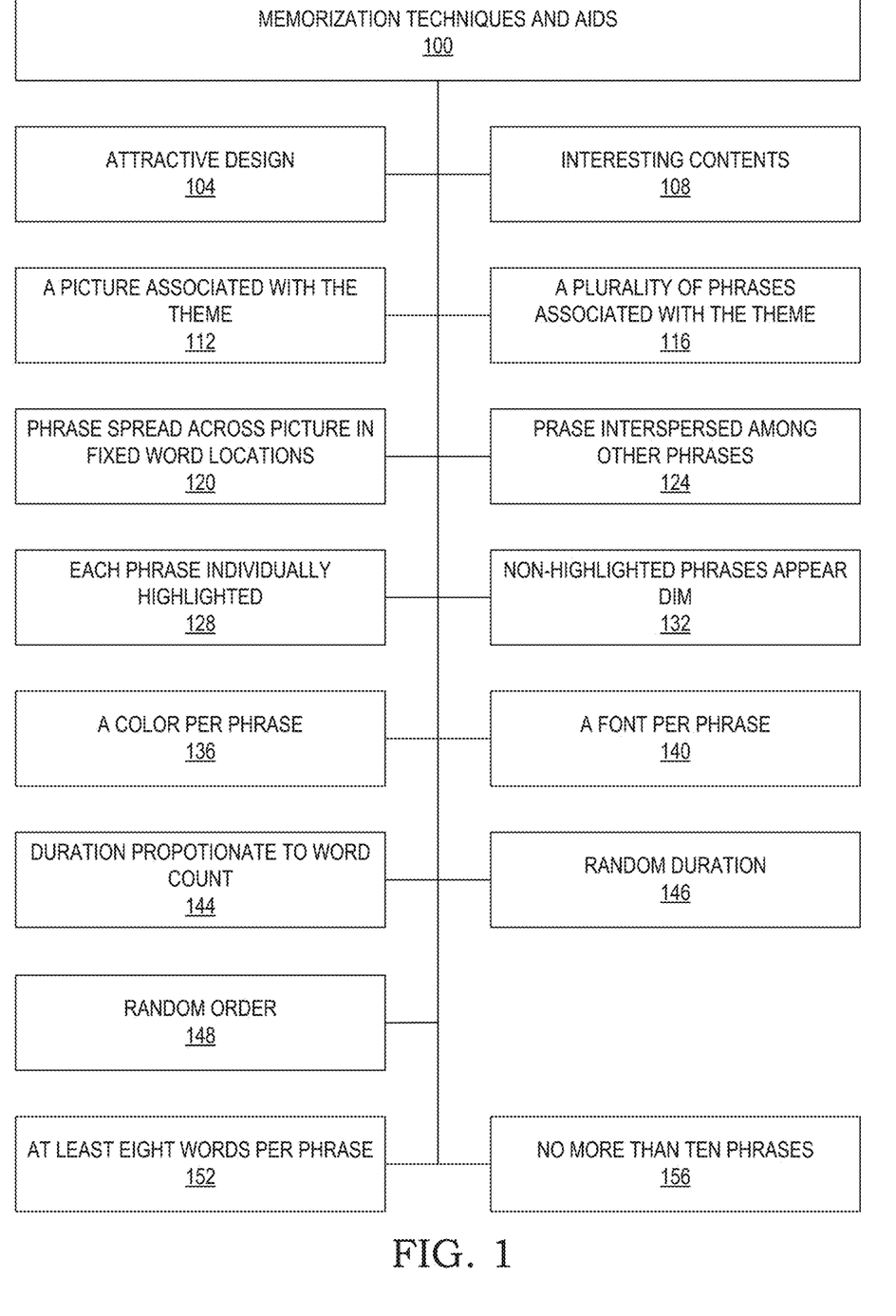
FIG. 1 is a simplified block diagram reviewing memorization techniques and aids.

FIG. 1 summarizes memorization techniques and aids 100 for memorizing a theme using an electronic display. For a user being motivated to use an electronic display, such a display may feature attractive design 104 and may display interesting contents 108. Users may memorize a theme via looking at a picture associated with the theme 112, in combination with reading a plurality of phrases associated with the theme 116. To focus attention on the content of phrases, each phrase is highlighted individually 128, while the other phrases may appear dim 132. Some users better memorize a phrase through a specific word arrangement, which leads to preference for displaying each phrase's words over and across the picture in fixed word locations 120, which further leads to the words of each phrase being interspersed among words of other phrases 124. Also, distinguishing among phrases by color 136 or font 140 may be helpful or look pleasing for some. The duration of highlighting a phrase may be different for different phrases, helping the user to distinguish between the two. In some cases, the duration of highlighting a phrase may be proportionate to the phrase's word count 144, which may help some to better read the phrase and digest its content. Randomizing 146 or otherwise changing the time duration of a phrase may be implemented. Some users may find a random order 148 of displaying the phrases providing better experience. A minimum of eight words per phrase 152 may convey a critical mass of meaning to some, while some may find a maximum of ten phrases 156 representing what they prefer to remember with respect to a theme.

Exemplary Theme

The following examples in FIGS. 2A-3B relate to the theme of Albert Einstein, represented by a picture showing Albert Einstein's face and three inspiring quotes originated by Einstein: "Once you stop learning you start dying", "A person who never made a mistake never tried anything new", and "Few are those who see with their own eyes and feel with their own hearts".

Figure 2A:
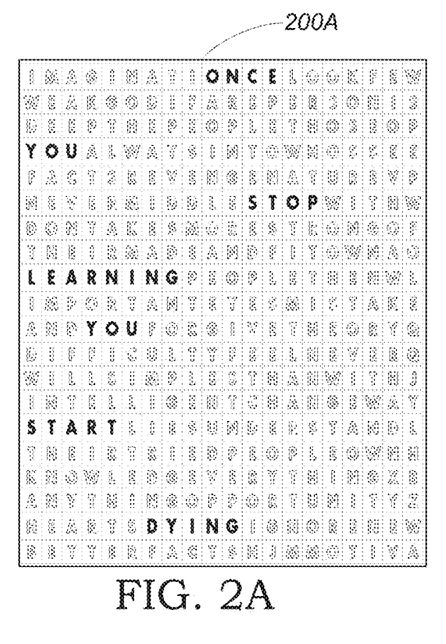
FIGS. 2A-2D are simplified illustrations of layouts of scattered, interspersed and selectively highlighted phrases.

FIG. 2A shows a layout 200A of a matrix of letters, that include the three quotes. The first quote is highlighted, the other two are currently not highlighted, while there are also dummy words and letters that turn layout 200A into an aesthetic frame and eye-catching puzzle.

Figure 2B:
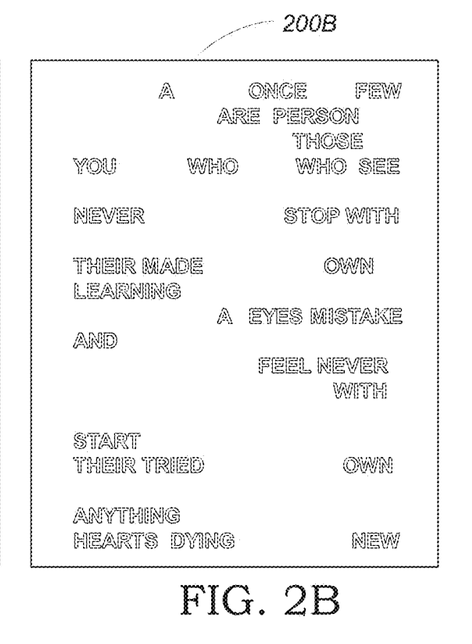
Figure 2C:
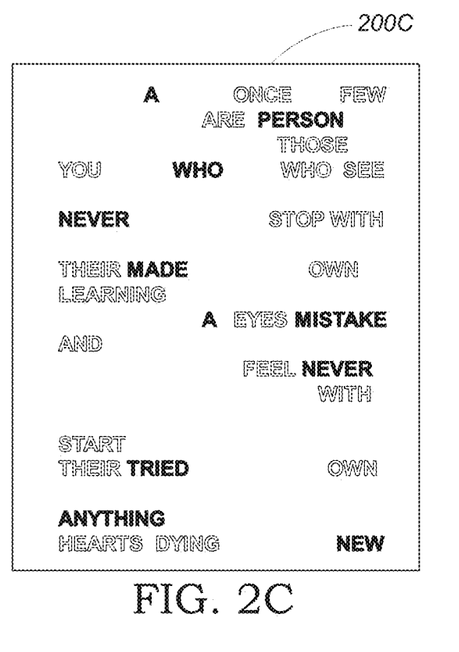
Figure 2D:
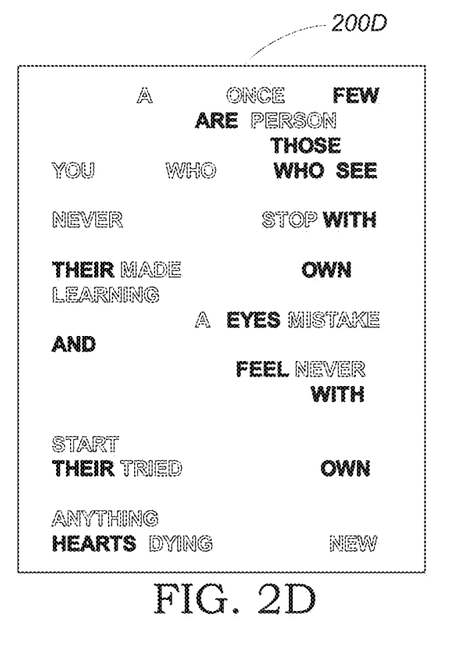

FIG. 2B shows a layout 200B arranging the quotes as a plurality of words, each word having a fixed location. Each quote is scattered across the two dimensions of the layout, and the words of each quote are interspersed among words of other quotes. Layout 200C of FIG. 2C and layout 200D of FIG. 2D demonstrate each of two phrases individually highlighted as represented in the drawings by bold type, while the other phrases remain dim, represented in the drawings by outline type.

Layouts 200A-200D of FIGS. 2A-2D demonstrate several concepts: (a) Phrases associated with a theme; (b) Each phrase scattered across the two dimensions of the layout; (c) Each phrase highlighted individually; and (d) Each phrase interspersed among words of other phrases. Additionally, layout 200A demonstrates optionally displaying additional dummy letters and words for aesthetic impact and interest. Also, layout 200A demonstrates the use of letters for forming phrases while layouts 200B-200D use words. It will be noted that different phrases may use different fonts and/or colors for their words, further distinguish phrases and possibly assisting in memorizing them.

Figure 3A:
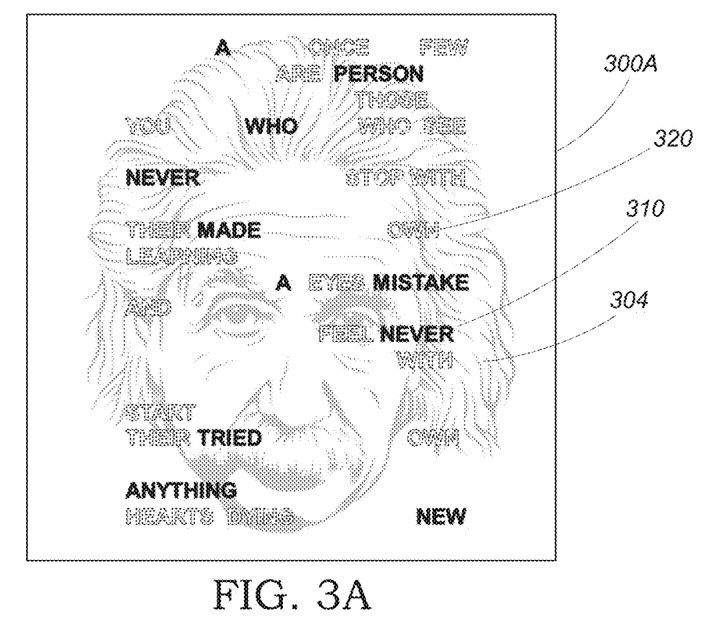
FIGS. 3A-3B are simplified illustrations of displays including a highlighted phrase and dimmed phrases over a picture.
Figure 3B:
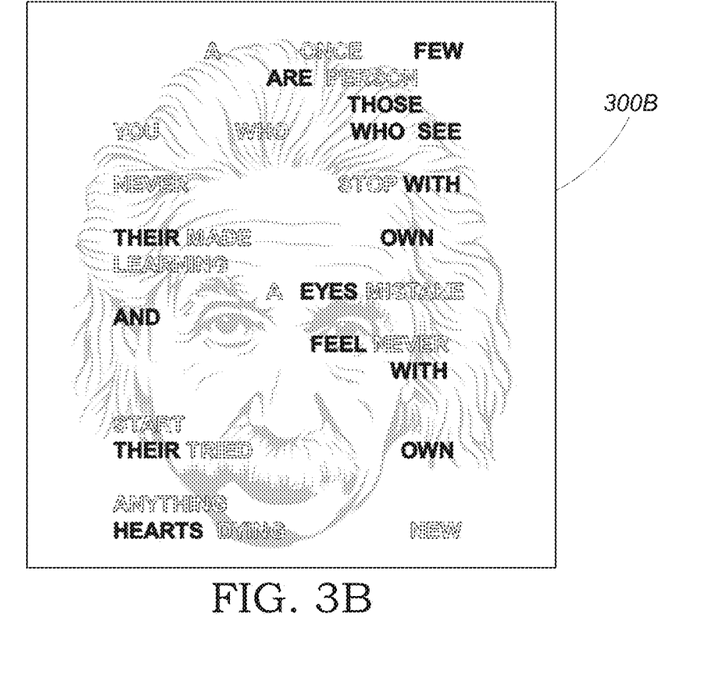

FIG. 3A depicts display 300A that shows Einstein's picture 304 associated with the theme, having the phrase of layout 200C overlaying over picture 304, while FIG. 3B shows display 300B that is the same as display 300A, except that a different phrase is individually highlighted according to layout 200D.

It shall be noted that FIGS. 3A-3B use a bold font for representing highlighted type and outline font for representing non-highlighted type. It will be noted that in some embodiments, as described below, highlighted type may be illuminated, while non-highlighted type may appear dim. Additionally, or alternatively, other highlighting techniques may be applied, such as presenting the letters or words using a different visual characteristic, such as using a different color, different font, different fill-in property, or the like.

Display Construction

Figure 4A:
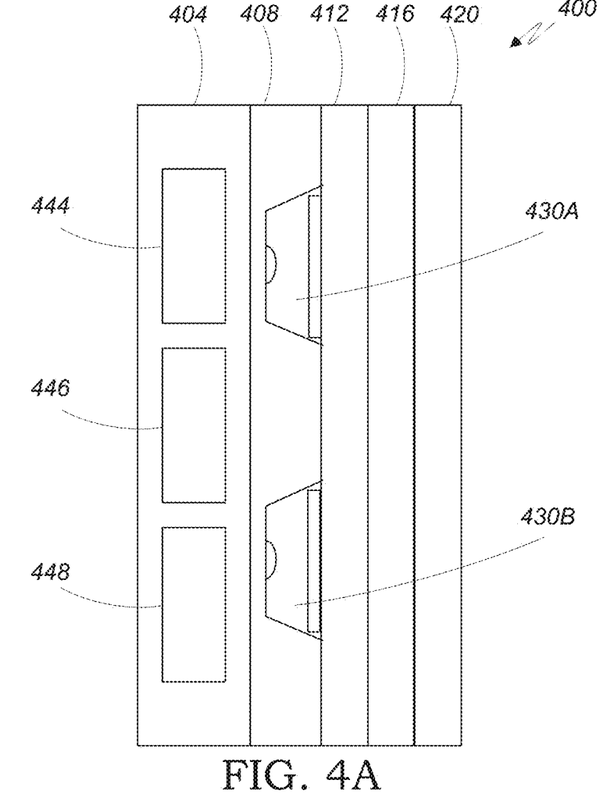
FIG. 4A is a simplified illustration of a display and layers of the display.

FIG. 4A schematically depicts an exemplary display 400 devised for memorizing a theme according to some embodiments of the present invention. In some exemplary embodiments, display 400 may be a Liquid-Crystal Display (LCD), a LED Display, a Cathode-Ray Tube (CRT) display, or the like. In some exemplary embodiments, display 400 may comprise substrate 416. Substrate 416 is made of transparent or translucent material such as plastic or glass. Picture layer 420 covers the front or back of substrate 416 with dyes that show a picture selected for demonstrating the theme. Letters or words of phrases representing the theme are embedded as voids or transparent or translucent type within picture layer 420. The letters or words of the phrases are located according to their designated locations, for example as demonstrated by FIGS. 2A-2B.

Picture layer 420 may use opaque dyes for showing the picture, and then the letters or words representing the phrases may be embedded within picture layer 420 as voids or transparent or translucent type. It will be noted that while picture layer 420 is shown in FIG. 4A in front of substrate 416, in other embodiments the picture layer may be disposed at he back of substrate 416.

Mask 412 may be provided for sharper type highlighted over the picture, and is further needed if picture layer 420 is not perfectly opaque. Mask 412 is made of opaque dyes disposed on the back of substrate 416 if picture layer 420 is positioned in front of substrate 416, or may be provided as a separate opaque substrate, such as a film, having transparent or translucent words embedded therein. Mask 412 includes the words of all the phrases representing the theme, each word located according to its designated location, for example as demonstrated by FIGS. 2A-2B, positioned exactly behind the corresponding word embedded within picture layer 420.

It will be noted that display 400 is devised for highlighting phrases. A phrase is composed of words, and a word is composed of one or more letters—with "I" and "A" being examples of one-letter words. While the letters of a word are aligned and spaced conventionally using monospaced or proportional spacing, the words of a phrase are scattered across picture layer 420 and mask 412 and are interspersed within words of other phrases, so that each phrase has its own location and appearance. However, the scattered words of each phrase are ordered left-to-right and top-to-bottom according to the word order of the phrase, which makes the phrases conventionally readable.

Lighting layer 408 is provided for controllably highlighting words of selected phrases, and includes a plurality of light sources 430. Light source 430A and light source 430B are two representative lighting sources, each devised to illuminate a single word such as word 450 of FIG. 4B, or a single letter such as letter 464 of word 460 of FIG. 4C. FIG. 4D schematically describes a light source 430, that includes a LED 434, reflective surface 438 and diffuser 442. Back to FIG. 4A, control box 404 includes control circuit 446 for selectably turning on and off each light source 430, power supply 448 for energizing control circuit 446 and light sources 430, and conductors 444 for connecting control circuit 446 to light sources 430. In some exemplary embodiments, control circuit 446 may be controlled from an external control instructing control circuit 446 to provide a desired output.

Figure 4B:
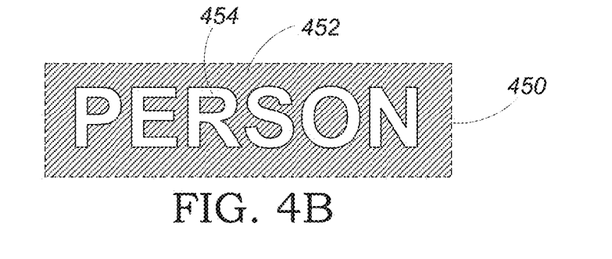
FIG. 4B is a simplified illustration of a word included in the display as part of a phrase.
Figure 4C:
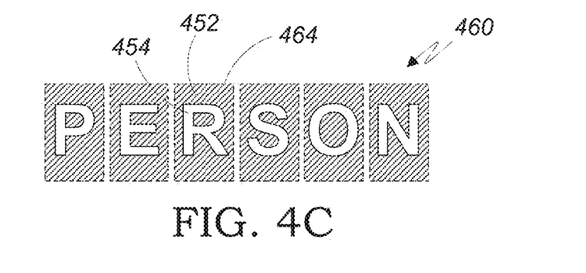
FIG. 4C is a simplified illustration of a word divided to letters.
Figure 4D:
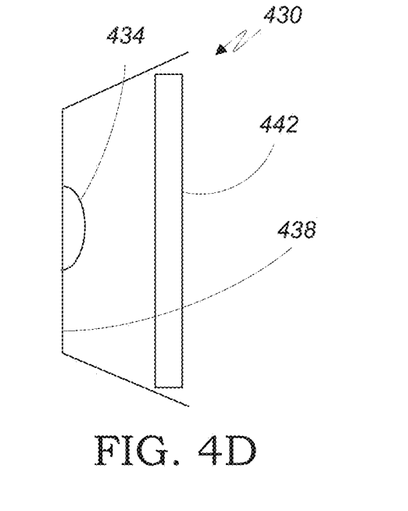
FIG. 4D is a simplified illustration of a light source for selectably highlighting a word or a letter.

FIG. 4B demonstrate an exemplary word 450 PERSON embedded as voids or transparent or translucent type 454 within opaque dyes or film 452 of picture layer 420 and/or mask 412. FIG. 4C demonstrates exemplary word 460 broken into letters that appear and are illuminated as separate letters. The examples of FIGS. 4B and 4C are compatible with the layouts of FIGS. 2B and 2A, respectively, and are chosen by aesthetic and/or production considerations.

In embodiments that include the use of different colors for different phrases, coloring may be made in the type included in picture layer 420 or mask 412, or in the diffusers 442 of the respective light sources 430.

It will be noted that the display embodiments of FIGS. 2A-4D are exemplary, and do not exclude other designs or types of displays that perform the functionalities described herein for memorizing themes.

Designing a Display for Memorizing a Theme

Figure 5:
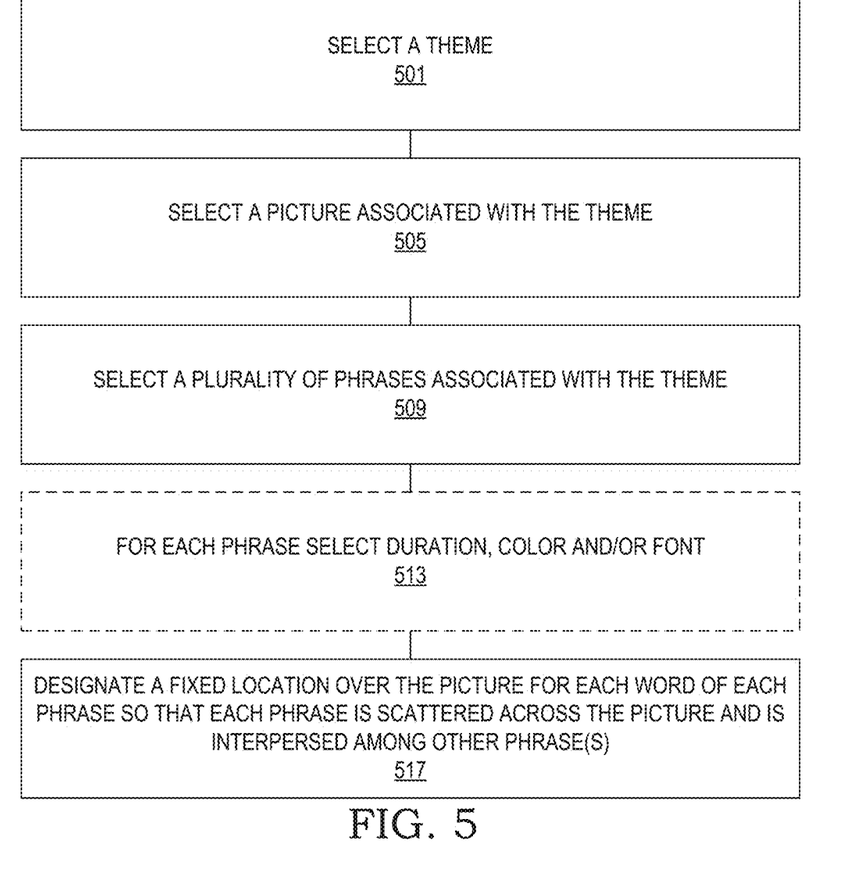
FIG. 5 is a simplified flowchart describing a process for designing a display.

FIG. 5 describes a process for designing a display for memorizing a theme. In step 501, a theme is selected. In step 505, a picture associated with the theme is selected, and in step 509, several phrases associated with the theme are selected. Examples for steps 501-509 include: a theme that is a famous person, a portrait picture of the person and inspiring quotes originated by the person; a famous city, a picture of a famous monument associated with the city and a set of trivia facts about the city; a rare animal, a picture of the animal and a set of trivia facts about the animal.

Optional step 513 includes three optional sub-steps for differentiating among the phrases selected in step 509. A duration for highlighting each phrase may be selected by the designer, and may fixed for all phrases, differ for each phrase, or the like. In some exemplary embodiments, a duration for highlighting a phrase may be proportionate to the word count of the phrase, so that each phrase can be read and digested conveniently, or may be random above a minimum that is sufficient for conveniently reading the phrase. A color may be selected for each phrase to distinguish it from other phrases. Similarly, a different font may be selected for each phrase.

Step 517 designates a fixed location over and relative to the picture for each word of the plurality of phrases, according to the following considerations: (a) the words of each phrase are scattered across the two dimensions of the picture, while their left-to-right and top-to-bottom order retains the phrase's normal word order, which renders each phrase readable when individually highlighted; however, the spacings among words and horizontal and vertical positioning of words looks unusual when a phrase is individually highlighted, to distinguish the phrases from one another, which may create interest and facilitate memorization for some users. (b) words of each phrase are interspersed among words of other phrase. Both considerations are demonstrated by the examples of FIGS. 2A-3B.

It will be noted that steps 501-509 may be performed by a human, while steps 513-517 may be assisted or performed by a computer.

Operation

Figure 6:
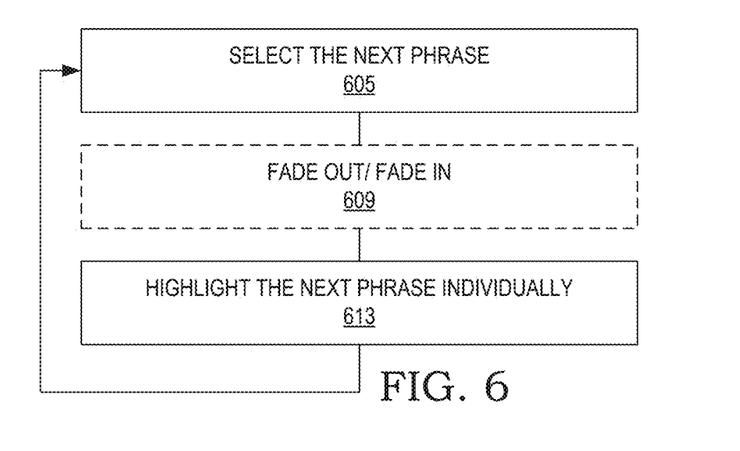
FIG. 6 is a simplified flowchart describing the operation of a control circuit for intermittently highlighting phrases.

FIG. 6 depicts the operation of control circuit 446 of FIG. 4 for highlighting phrases individually over a picture, to facilitate memorizing the respective theme via the picture and the phrases. Step 605 selects the next phrase to be highlighted, while the previous phrase is currently highlighted over the picture. The next phrase may be selected according to a predetermined sequence programmed into control circuit 446, or be randomly selected by control circuit 446, as some users may better memorize themes presented in a predefined order, while others are attracted by the surprise offered by a random selection. Optional step 609 offers a pleasing effect of fading out the previous phrase while fading in the next phrase. In step 613, the next phrase, selected in step 605, is individually highlighted, while all other phrases are not highlighted and remain dim—as shown in FIGS. 3A-3B. The highlighted words appear in their designated locations as per step 517 of FIG. 5, and possibly according to phrase-specific or highlighting-occurrence specific duration, color and/font, per optional step 513. Following highlighting the phrase for the specified duration, the process of FIG. 6 loops back to step 605, for another round of selection and highlighting.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

What is claimed is:

1. An electronic display for exhibiting a theme via a picture and a plurality of phrases, the picture and phrases associated with the theme, the electronic display comprising:
    a transparent or translucent substrate;
    a picture layer of dyes disposed on the substrate and showing the picture;
    words of the plurality of phrases embedded as voids or transparent letters or translucent letters within the picture layer, wherein: (i) the words of each phrase are scattered across the picture, and (ii) words of a phrase of the plurality of phrases are interspersed among words of other phrases of the plurality of phrases;
    a set of light sources disposed behind the substrate for controllably illuminating letters or words embedded within the picture layer so that illuminated letters or words are highlighted over the picture; and
    a control circuit for selectively actuating light sources of the set of light sources to intermittently highlight each phrase of the plurality of phrases for being individually highlighted over the picture.

2. The electronic display of claim 1, wherein the words of the plurality of phrases, while not highlighted, appear in dim type over the picture.

3. The electronic display of claim 1, wherein the plurality of phrases includes no more than ten phrases.

4. The electronic display of claim 1, wherein each phrase of the plurality of phrases includes at least eight words.

5. The electronic display of claim 1, wherein duration of highlighting a phrase is proportionate to the phrase's word count.

6. The electronic display of claim 1, wherein phrases are highlighted in random order.

7. The electronic display of claim 1, wherein different phrases appear in different fonts.

8. The electronic display of claim 1, wherein different phrases appear in different colors.

9. The electronic display of claim 1, wherein said control circuitry is configured to determine a highlighting duration of each phrase, wherein the control circuitry is configured to determine a first highlighting duration of a phrase and a second highlighting duration of the phrase, whereby the phrase is highlighted for different durations in different highlighting occurrences.

10. The electronic display of claim 1, wherein said control circuitry is configured to highlight a first phrase for a first duration and a second phrase for a second duration, wherein the first duration is different than the second duration.

11. A method for exhibiting a theme via presenting a picture and a plurality of phrases, the picture and phrases associated with the theme, the method comprising:
    visually exhibiting the picture;
    designating for each word of the plurality of phrases a fixed location relative to the picture, so that: (i) the words of each phrase are scattered across the picture, and (ii) words of a phrase of the plurality of phrases are interspersed among words of other phrases of the plurality of phrases; and
    intermittently highlighting each phrase of the plurality of phrases individually over the picture, each word located according to the respective designated fixed location of the word.

12. The method of claim 11, wherein the words of the plurality of phrases, while not highlighted, appear in dim type over the picture.

13. The method of claim 11, wherein the plurality of phrases includes no more than ten phrases.

14. The method of claim 11, wherein each phrase of the plurality of phrases includes at least eight words.

15. The method of claim 11, wherein duration of highlighting a phrase is proportionate to the phrase's word count.

16. The method of claim 11, wherein phrases are highlighted in random order.

17. The method of claim 11, wherein different phrases appear in different fonts.

18. The method of claim 11, wherein different phrases appear in different colors.

19. The method of claim 11, wherein different phrases are highlighted for different time durations.

20. The method of claim 11 wherein said intermittently highlighting:
   determining for a phrase, a first highlighting duration;
   highlighting the phrase for the first highlighting duration;
   determining for the phrase, a second highlighting duration, wherein the second highlighting duration is different than the first highlighting duration; and
   highlighting the phrase for the second highlighting duration.

21. A computer program product for exhibiting a theme via presenting a picture and a plurality of phrases, the picture and phrases associated with the theme, the computer program product retaining program instructions, which program instructions when read by a processor, cause the processor to instruct a display device to:
   display the picture and the plurality of phrases, wherein:
      (i) the words of each phrase are scattered across the picture, (ii) words of a phrase of the plurality of phrases are interspersed among words of other phrases of the plurality of phrases; and (iii) each word of each of the plurality of phrases is visible in the display in either a highlighted or non-highlighted mode; and
   intermittently highlight each phrase of the plurality of phrases individually over the picture, each word located according to the respective designated fixed location of the word.

* * * * *